Patented Sept. 4, 1945

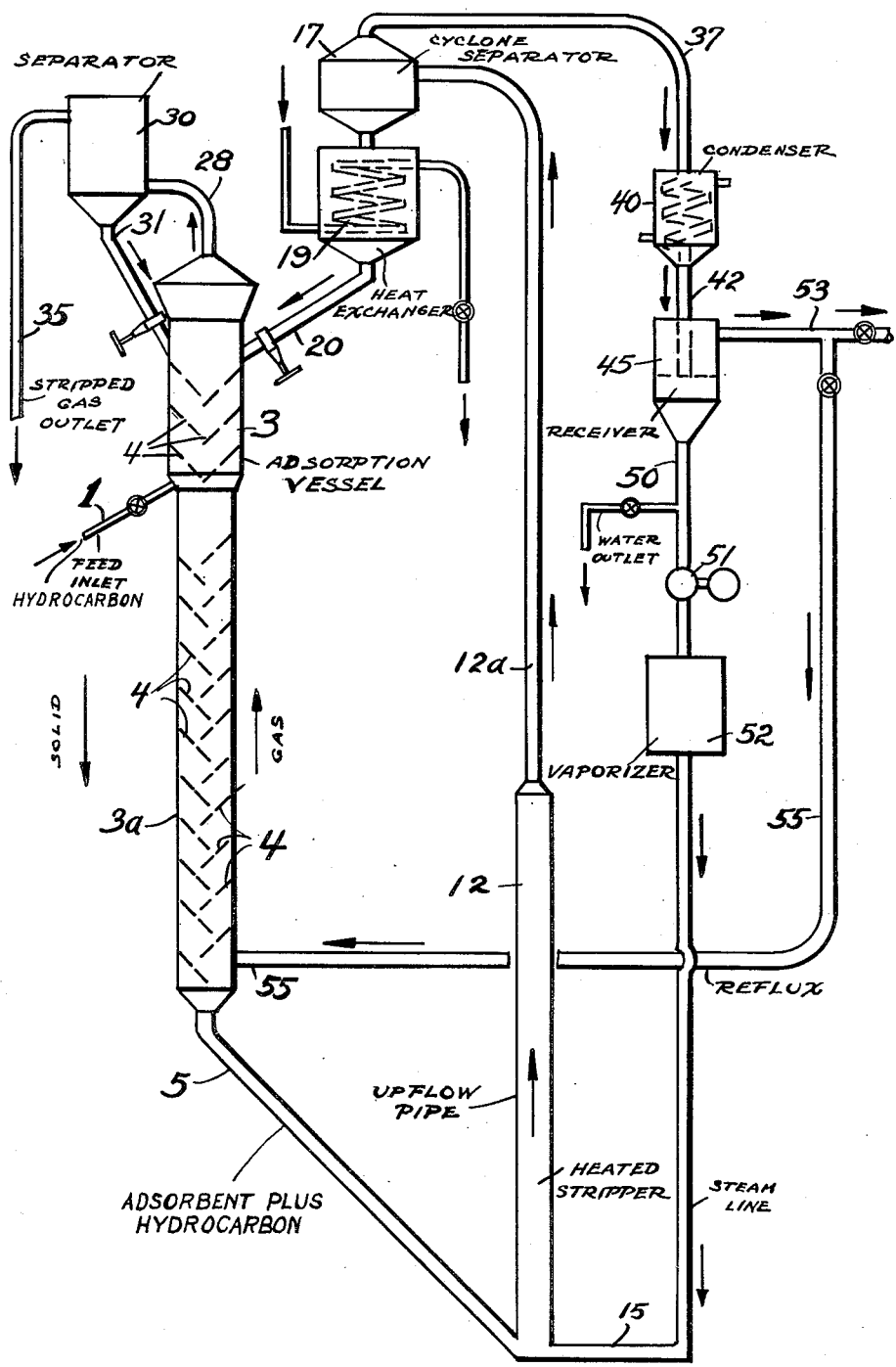

2,384,311

UNITED STATES PATENT OFFICE 2,384,311

CHEMICAL PROCESS

Kenneth K. Kearby, Elizabeth, N. J., assignor, by mesne assignments, to Jasco, Incorporated, a corporation of Louisiana Application February 12, 1942, Serial No. 430,543

14 Claims. (Cl. 260—677)

The present invention relates to improvements in the art of separating gaseous or liquid mixtures into components of any desired purity. Thus, it includes improved methods for separating olefin hydrocarbons from a mixture of olefins and paraffins, by preferential adsorption of said olefins on powdered adsorbents, which adsorbents are caused to flow countercurrently against the upflowing hydrocarbon mixture in an adsorption zone.

It is well known, of course, to those familiar with the art of preparing synthetic rubber or rubber-like materials from unsaturated hydrocarbons, that butadiene and similar olefinic hydrocarbons which are used as starting materials in certain processes for producing rubber substitutes, are produced as a by-product in the ordinary process of refining petroleum oils, as in the cracking thereof. Ordinarily, in refinery practice, the amount of butadiene produced is not a large percentage of the total product based on the original feed stock nor is it even a large proportion of the $C_4$ fraction normally produced in, say, the cracking of a gas oil. However, butadiene is produced in sufficient quantities in such operations to make separation and purification from such sources commercially feasible. Also, where butadiene is produced by dehydrogenation, the reaction product may and usually does, consist of a mixture of paraffins, olefins and diolefins, including butadiene, and it is necessary to separate the butadiene from the mixture.

Whether the butadiene is made as a by-product in the cracking of a gas oil or some similar process, or whether it is made by dehydrogenation of a paraffin or mono-olefin, its separation from associated $C_4$ hydrocarbons, such as normal and isobutane, the butenes, and the like, constitute a difficult problem. In other words, where the butadiene is present, let us say in a $C_4$ cut recovered from a debutanizer employed to stabilize gasoline, the quantity thereof may amount to less than 1% of the $C_4$ hydrocarbons recovered from the fractionator or stabilizer. Similarly, where butadiene is produced by dehydrogenating butene, of course the reaction is not quantitative and the reaction products recovered from the dehydrogenation zone will contain constituents other than butadiene. Butadiene cannot easily be separated from the other $C_4$ hydrocarbons by distillation and fractionation because of close proximity of the boiling points of the several $C_4$ hydrocarbons present in the total fraction. Therefore, it has been the practice, prior to my invention, to employ a liquid absorption means of some sort to dissolve the desired butadiene out of the $C_4$ hydrocarbons, to the exclusion of the other $C_4$ hydrocarbons. Also separation by solid adsorbent (e. g., activated carbon, etc.), has been practiced before. However, the adsorption has been carried out by simply passing the mixture to be separated through a stationary bed of the adsorbent.

My invention, on the other hand, contemplates preferentially adsorbing a desired hydrocarbon such as butadiene from a mixture containing said desired hydrocarbon on a solid adsorption material, such as silica gel, in a countercurrent operation which may be carried out continuously and in one aspect, my invention comprises gravitating the adsorbent material through an upwardly flowing current of gas containing the desired hydrocarbon, whereupon the latter is preferentially adsorbed by the adsorbent material. An important feature of my process resides in the concept of recycling to the adsorption zone a quantity of the concentrated product as reflux. By my process, a desired constituent in any degree of purity may be recovered from a mixture containing the said desired constituent.

One object of my invention, therefore, is to provide a process wherein a desired substance may be preferentially concentrated and recovered from a mixture containing the same, by countercurrently contacting an adsorbent material with the said mixture, thereafter stripping the desired substance from the adsorbent by any suitable means such as stripping steam, and recycling a part of the desired substance as reflux to increase the concentration of the latter in the final product.

A specific object of my invention is to separate olefins from paraffins in a continuous operation directed toward olefin recovery in any desired degree of purity or concentration.

Other and further objects of my invention will appear from the following more detailed description and claims.

The accompanying drawing shows diagrammatically a form and arrangement of apparatus in which my invention may be carried into practical effect.

I shall now set forth a preferred modification of my invention and in so doing shall refer to the accompanying drawing, but it is to be understood that the precise details I am about to recite are purely illustrative and do not impose any limitation of my invention.

Referring in detail to the drawing, a C₄ fraction containing butanes and butenes is introduced into the system through line 1 and thence caused to flow upwardly into an adsorption zone comprising a standpipe 3 where it contacts an adsorbent material, such as silica gel, which is in powdered form, say having a particle size of from 100 to 400 mesh. In the adsorption zone, the butenes are preferentially adsorbed by the powdered material. The adsorbent material proceeds downwardly through the standpipe 3 and its extension 3—a, the latter of somewhat more restricted cross sectional area than 3, and is then discharged through a pipe 5 into an upflow pipe 12.

Standpipe 3 is made of greater diameter than 3—a so that the relative velocities of the gas and solid in both will be approximately the same. Also, to insure intimate contact the pipes 3 and 3—a may contain baffles 4.

The solid material in pipe 5 is discharged, as stated, into an upflow pipe 12 together with a quantity of steam which is discharged into upflow pipe 12 through line 15. The steam acts as a carrier for the solid and also serves to strip the adsorbed butenes from said solid. The solid material suspended in the steam passes upwardly through pipe 12 and its upward extension 12—a and is discharged into a cyclone separator 17. The velocity of the suspension of adsorbent material in the steam in pipe 12 may be about 20 ft./second, although somewhat lower velocities, such as 10 ft./second, may be employed. The solid adsorbent material separated from the steam and the butenes is withdrawn from cyclone separator 17 and cooled in a heat exchanger 19, thence discharged through a dense phase standpipe 20 into the top of standpipe 3 for reuse in the process. The gases not adsorbed by the adsorbent are withdrawn from the top of the standpipe through pipe 28 and preferably discharged into an electrical precipitator or other separating device 30, where very fine adsorbent particles which may be carried over by entrainment by the stripped feed gases are separated out from the stripped feed and returned through pipe 31 to the top of the standpipe 3. The stripped feed gases are rejected from the system through line 35. Pipes 5, 20, and 31, as shown, contain during the process rather closely compacted solid or dense phase solid (say a mass having a density of 20–30 lbs./cu. ft.) and the powdered material in this condition serves as a gas seal against the escape of gas from the adsorption tower, except at desired points.

Referring again to cyclone separator 17, the butenes and steam vapors are withdrawn from the cyclone separator 17 through line 37, thence are discharged into a condenser 40 where the steam is condensed and a mixture of the butenes and water is discharged through line 42 into a receiver 45. The water is withdrawn from the receiver through line 50 by pump 51, vaporized in vaporizer 52 and recycled through pipe 15 to stripper 12. The product, that is to say, the gases rich in butenes are withdrawn from the system through line 53. However, a portion of these gases are recycled through line 55 to the bottom of the standpipe extension 3—a where they serve as a sort of reflux comparable or analogous to the use of liquid reflux in liquid extraction to facilitate and improve the adsorption taking place in standpipes 3 and 3—a, by increasing the concentration of butenes in the final product.

Instead of using silica gel, I may use other known adsorbent material having selective adsorption properties for the desired product, such as activated charcoal, activated alumina, and the like.

Many modifications of my invention will readily suggest themselves to those who are familiar with this art. For instance, while I have described in detail an operation in which a normally gaseous mixture was treated to recover a desired component, my invention includes also separating a desired component either normally gaseous or normally liquid from a liquid, or a mixture of normally liquid and gaseous components. Also, I may separate aromatics from mixtures of aliphatic and aromatic components or I may separate inorganic compounds such as $H_2S$, $CO_2$, $NH_3$, $NO_2$, etc., from mixtures with other gases. In the case where I separate desired components from a liquid mixture, I employ the solid adsorbent preferably in the form of relatively larger size than the powder employed for fractionating gases. Thus, in the case of the treatment of liquids, I employ granules or lumps of adsorbent having a size of say from 2–10 mesh or larger. Where relatively large granules are employed, I may substitute a Redler conveyor, a traveling belt or other suitable conveying means for returning the adsorbent to the top of the adsorption zone 3.

What I claim is:

1. The method of separating a desired hydrocarbon from a mixture of hydrocarbons containing the same, which comprises causing the said mixture to flow countercurrently to a solid adsorbent material in an adsorption zone, stripping the desired hydrocarbon from the said solid and refluxing a portion of said desired hydrocarbon to said adsorption zone at a point beyond that at which said countercurrent flow takes place, whereby the adsorbent is further charged prior to the stripping operation.

2. The process set forth in claim 1 in which the adsorption is carried out under superatmospheric pressure.

3. The method set forth in claim 1 in which the adsorption is carried out in the presence of a powdered solid adsorbent material.

4. The method set forth in claim 1 in which an olefinic compound is separated from a mixture of C₄ hydrocarbons.

5. The method set forth in claim 1 in which monoolefins are separated from paraffins.

6. The method set forth in claim 1 in which butylenes are separated from saturated C₄ hydrocarbons.

7. An improved process for separating olefin hydrocarbons from a mixture of olefin and paraffin hydrocarbons, which comprises gravitating a solid adsorbent material in powdered form through an adsorption zone, causing the said mixture to flow countercurrently thereto through the said adsorption zone, recovering the solid adsorbent material containing olefins from the bottom of said adsorption zone, treating the solid adsorbent material with a stripping gas in order to liberate the adsorbed olefins and refluxing a portion of said olefins to the adsorption zone at a point beyond that at which said countercurrent flow takes place, whereby the adsorbent is further charged prior to the stripping operation.

8. The process set forth in claim 7 in which the stripping gas is steam.

9. A continuous process for separating olefin hydrocarbons from a mixture of olefin and paraffinic hydrocarbons, which comprises gravitating a solid adsorbent material in powdered form through an adsorption zone, causing the said mixture to flow countercurrently thereto through the said adsorption zone, recovering the solid adsorbent material containing olefins from the bottom of said adsorption zone, treating the solid adsorbent material with a stripping gas in order to liberate the adsorbed olefins and refluxing a portion of said olefins to the absorption zone at a point beyond that at which said countercurrent flow takes place, whereby the adsorbent is further charged prior to the stripping operation.

10. The process set forth in claim 9 in which butenes are separated from a $C_4$ hydrocarbon cut containing olefins and paraffins.

11. The process set forth in claim 9 in which butenes are separated from a mixture of butenes and butanes.

12. The method of separating a desired constituent from a mixture containing said constituent which comprises causing the said mixture to flow countercurrently to a solid adsorbent material in an adsorption zone, stripping the desired constituent from the solid and refluxing a portion of said desired constituent to said adsorption zone at a point beyond that at which said countercurrent flow takes place, whereby the adsorbent is further charged prior to the stripping operation.

13. The process set forth in claim 12 in which the mixture is gaseous.

14. The process set forth in claim 12 in which the mixture is a two component gaseous mixture.

KENNETH K. KEARBY.